| United States Patent [19] | [11] 3,846,409 |
| --- | --- |
| Marx | [45] Nov. 5, 1974 |

[54] 10,11-METHANO 5H-DIBENZ [B,F] AZEPINES 5-PHENACYL DERIVATIVES

[75] Inventor: Michael Marx, Sunnyvale, Calif.

[73] Assignee: Syntex (U.S.A.) Inc., Palo Alto, Calif.

[22] Filed: Dec. 7, 1971

[21] Appl. No.: 205,741

Related U.S. Application Data

[63] Continuation-in-part of Ser. No. 126,920, March 22, 1971.

[52] U.S. Cl. ............................. 260/239 D, 424/244
[51] Int. Cl. ............................................. C07d 41/08
[58] Field of Search ................................ 260/239 D

[56] References Cited
UNITED STATES PATENTS

| 3,637,660 | 1/1972 | Eriksoo et al. | 260/239 D |
| 3,679,662 | 7/1972 | Morita et al. | 260/239 D |

*Primary Examiner*—Joseph A. Narcavage
*Attorney, Agent, or Firm*—Lawrence S. Squires; Gerard A. Blaufarb; William B. Walker

[57] ABSTRACT

Phenacyl, and ring substituted phenacyl, derivatives of 10,11-dihydro-10,11-methano (and 10a-halo substituted-10,11-methano)-5-(γ-alkyl-aminopropyl)-5H-dibenz[b,f]azepine, at the N-amino side chain, and methods of preparing these compounds. The compounds are broadly prepared by treating the corresponding parent compound with ω-bromoacetophenone, or the desired ring substituted ω-bromoacetophenone. The compounds have utility for palliating conditions of mental depression, occurring in mammals related to the central nervous system.

1 Claim, No Drawings

10,11-METHANO 5H-DIBENZ [B,F] AZEPINES 5-PHENACYL DERIVATIVES

CROSS REFERENCE TO RELATED APPLICATIONS

This application is a continuation-in-part of application U.S. Ser. No. 126,920 filed Mar. 22, 1971.

BACKGROUND OF THE INVENTION

1. Field of the Invention

This invention relates to phenacyl, and ring substituted phenacyl, derivatives of 5-(γ-alkylaminopropyl)-10,11-dihydro-10,11-methano (and halomethano)-5H-dibenz[b,f]azepine via attachment to the γ-nitrogen atom of the 5-aminopropyl side chain. In a further aspect this invention relates to 5-[γ-(N-alkyl-N-phenacyl)amino]propyl-10,11-dihydro-10,11-methano-5H-dibenz[b,f]azepine derivatives, including derivatives in which the phenyl ring of the phenacyl moiety can be optionally substituted. In a still further aspect this invention relates to 5-[γ-(N-alkyl-N-phenacyl)amino]propyl-10,11-dihydro-10,11-monohalomethano-5H-dibenz[b,f]azepine derivatives including ring substituted phenacyl derivatives. In another aspect this invention relates to 5-[γ-(N-alkyl-N-phenacyl-)amin-propyl-10,11-dihydro-10,11-dihalomethano-5H-dibenz[b,f]azepine derivatives including ring substituted phenacyl derivatives. In still another aspect this invention relates to pharmaceutically acceptable salts of the aforementioned compounds. This invention also relates to uses for, and methods of, and means for preparing the aforementioned compounds and pharamaceutically acceptable salts thereof.

2. Prior Art

Within the past fifteen years, significant advances have occurred within the field of chemotherapy, especially with respect to the treatment of mental depression. One family of compounds, which have been found to be particularly useful in the treatment of endogenous depression, is the family comprising dibenzazepine and dibenzocycloheptene compounds. These compounds are characterized by two benzene rings joined together by a fused cycloheptane ring. The cycloheptene ring frequently contains at least one hetero constituent such as, for example, nitrogen in the dibenzazepines, and can optionally contain a double bond in the two-carbon atom bridge linking the two benzene rings. A further discussion of this family of compounds, including their chemotherapeutic usefulness in the treatment of mental depression can be had by reference to the literature of the prior art such as, for example, Biel, J., "Chemopharmacologic Approaches to Mental Depression," *Drugs Affecting the Nervous System*, Edit., Burger; Vol. 2, pages 85-125, Marcel Dekker Corp., New York (1968); and Dale, J., "Some Rationales for the Development of Anti-Depressant Drugs," *Molecular Modification in Drug Design*, Advances in Chemistry Series, 45, pages 114-139, 129-136, American Chemical Society, Washington, D.C. (1964); and Klerman and Cole, "Clinical Pharmacology of Imipramine and Related Anti-Depressant Compounds," *Pharmacological Reviews*, Vol. 17, No. 2, pages 101- 141 (1965). The chemotherapeutic treatment of mental depression is unfortunately necessarily complex and different compounds within this family are frequently found to be more effective than others in the treatment of a given type of mental depression or even patient. The effectiveness of these compounds has been found to be influenced by such factors as molecular size and/or electronic activity. Thus, even though the aforementioned family of compounds are known to produce an anti-depressant effect, there is a need for new compounds within this family having different molecular sizes and/or configurations and/or electronic activities, which can therefore afford greater flexibility in the efficient treatment of specific cases of mental depression.

Accordingly, I have discovered novel derivatives of the dibenzazepine series of compounds described in my co-pending application Ser. No. 126,920, filed Mar. 22, 1971, which exhibit anti-depressant activity in mammals and which exhibit even lower toxicity levels at the same relative potencies as compared with the corresponding parent compounds.

SUMMARY OF THE INVENTION

In summary the compounds of my invention can be represented by the formula:

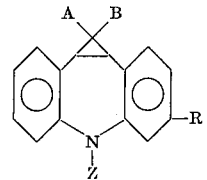

wherein A and B are independently selected from the group hydrogen, chloro or fluoro; R is hydrogen, lower alkyl, lower alkoxy, halo, cyano, trifluoromethyl or thiomethyl and Z is a γ-(N-phenacyl, or ring substituted phenacyl, N-alkylamino)propyl group.

Also encompassed within my invention are pharmaceutically acceptable salts thereof.

In summary the compounds of my invention are prepared, according to the process of my invention, by treating the corresponding 5-(γ-alkylaminopropyl)-10,11-dihydro-10,11-methano; chloro and/or fluoro substituted methano; -5-H-dibenz[b,f]azepine with phenacyl halide, or the desired ring substituted phenacyl halide, under reactive conditions.

The invention will be more thoroughly described herein below.

FURTHER DESCRIPTION OF THE INVENTION AND PREFERRED EMBODIMENTS

The compounds of my invention can be represented by the following formula:

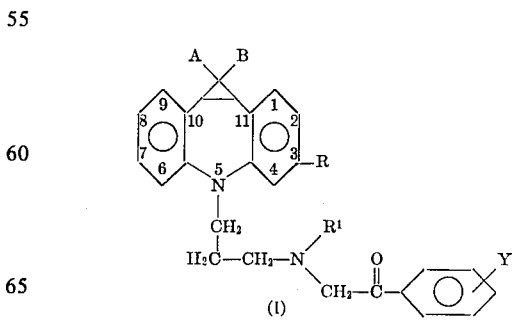

wherein A and B are independently selected from the group of hydrogen, chloro or fluoro; R is hydrogen, lower alkyl, lower alkoxy, halo, cyano, trifluoromethyl or thiomethyl; $R^1$ is lower alkyl; and Y is hydrogen, halo, haloalkyl having from one through four carbon atoms and from one through four halo atoms, lower alkyl or lower alkoxy, and can be at any position on the phenyl ring.

Also encompassed within my invention are pharmaceutically acceptable salts of the above compounds.

Unless expressly stated to the contrary, the following terms, as used herein above and below, have the following meanings. The term lower alkyl refers to alkyls having from one through six carbon atoms and includes both straight chain and branched chain alkyls such as, for example, methyl, ethyl, isopropyl and the like. The term lower alkoxy refers to alkoxies having from one through six carbon atoms and preferably methoxy or ethoxy. The term halo refers to the halogen radicals fluoro, chloro, bromo, and iodo. The term haloalkyl refers to both straight chain and branched chain alkyls having from one through four carbon atoms and from one through four halo substituents such as, for example, trifluoromethyl, 1,2,2,2-tetrafluoroethyl, and the like. The term room temperature refers to about 20°C and all temperatures and temperature ranges refer to degrees Centigrade.

The term pharmaceutically acceptable salts refers to those salts which do not adversely affect the pharmaceutical properites of the compounds of formula I such as, for example, are conventionally used in the pharmaceutical art. Typical pharmaceutically acceptable salts thus include addition salts of inorganic acids such as, for example, sulfuric, alkylsulfonic, arylsulfonic, nitric, phosphoric, hydrochloric acids and the like, and addition salts of organic acids such as, for example, acetic, citric, lactic, palmitic, tartaric, succinic, maleic, benzoic acids and the like.

Typical examples of the compounds of my invention can, for example, be had herein below by reference to the examples.

The preferred compounds of my invention are:

10,11-dihydro-10,11-methano-5-[γ-(N-p-chlorophenacyl-N-methyl)aminopropyl]-5H-dibenz[b,f]azepine;

10,11-dihydro-10,11-methano-5-[γ-(N-o-chlorophenacyl-N-methyl)aminopropyl]-5H-dibenz[b,f]azepine;

10,11-dihydro-10,11-methano-5-[γ-(N-p-methylphenacyl-N-methyl)aminopropyl]-5H-dibenz[b,f]azepine, 3-chloro-10,11-dihydro-10,11-methano-5-[γ-(N-p-chlorophenacyl-N-methyl)aminopropyl]-5H-dibenz[b,f]azepine;

10,11-dihydro-10,11-methano-3-trifluoromethyl-5-[γ-(N-p-chlorophenacyl-N-methyl)aminopropyl] -5H-dibenz[b,f]azepine, 10,11-difluoromethano-10,11-dihydro-5-[γ-(N-p-chlorophenacyl-N-methyl)aminopropyl]-5H-dibenz[b,f]azepine;

10,11-difluoromethano-10,11-dihydro-5-[γ-(N-o-chlorophenacyl-N-methyl)aminopropyl]-5H-dibenz[b,f]azepine;

10,11-difluoromethano-10,11-dihydro-5-[γ-(N-p-methylphenacyl-N-methyl)aminopropyl]-5H-dibenz[b,f]azepine; and 10,11-chloromethano 10,11-dihydro-5-[γ-(N-p-chlorophenacyl-N-methyl)aminopropyl]-5H-dibenz[b,f]azepine.

In terms of the A, B, R, $R^1$ and Y substituents, I have found that the compounds of my invention wherein $R^1$ is methyl have superior potencies. With respect to the A and B positions the preferred compounds are those in which A and B are both H. With respect to the R position, the preferred substituents are hydrogen, chloro and trifluoromethyl and especially hydrogen. With respect to the Y position, the preferred substituents are p-chloro, o-chloro, p-bromo, o-bromo, hydrogen, p-methoxy, p-trifluoromethyl, o-trifluoromethyl, p-methyl, o-methyl and p-t-butyl, and especially p-chloro, o-chloro and p-methyl.

The process of my invention can be conveniently represented by the following schematic overall reaction equation:

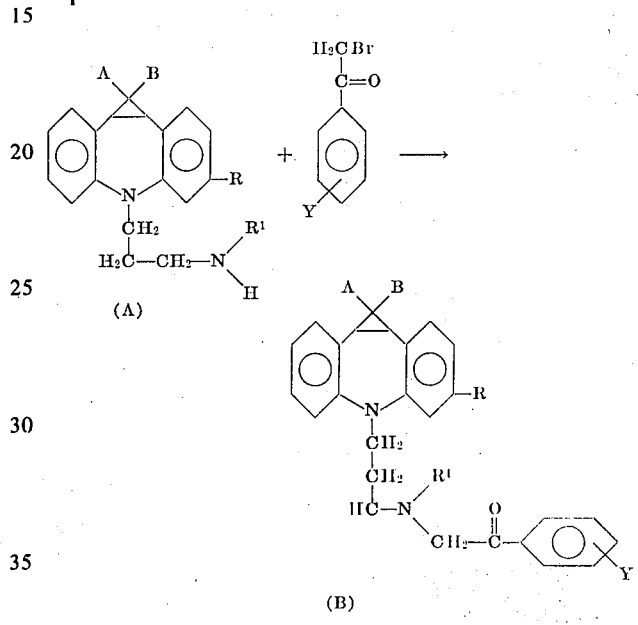

wherein A, B, R, $R^1$ and Y are as defined herein above.

This process can be effected by treating the corresponding compound of formula (A) with the desired ω-bromoacetophenone or ring substituted ω-bromoacetophenone (formula B), in a suitable inert organic solvent. Typically this treatment is conducted at temperatures in the range of about from 0° to 100°C and preferably about from 10° to 35°C for about from 1 to 72 hours and preferably about from 2 to 18 hours. Typically a mole ratio of about from 1 to 5 moles of acetophenone, or ring substituted acetophenone (formula B), is used per mole of starting material of formula A, and preferably about from 1.0 to 1.5 moles of starting material B per mole of starting material A. However, temperatures, treatment times and mole ratios both above and below these ranges and ratios can also be used. Also best results are obtained by conducting the treatment in the presence of a mild reducing agent, to inhibit oxidation of the product, and a mild base to neutralize the hydrobromic acid by-product formed during the reaction. The reducing agent and base can be conveniently added in an aqueous solution or solutions.

The respective products can be separated from their respective reaction mixtures and further purified by any suitable procedure such as, for example, precipitation, filtration, extraction, crystallization, chromatography, etc. Specific illustrations of typical separation and purification procedures can be had by reference to the examples set forth herein below. However, other suitable separation and purification procedures could, of course, also be used.

Suitable inert organic solvents which can be used, include, for example, benzene, diethyl ether, N,N-dimethylformamide, acetone and the like. The starting materials of formula A can be prepared according to the procedures described in my co-pending application Ser. No. 126,920, filed Mar. 22, 1971, which procedures are hereby incorporated by reference. Many starting materials of formula A can also be prepared according to the procedures described in German patent application No. 2,030,315 (Belgium Pat. No. 752,190), also published in the Derwent System under the Derwent No. 94271. The compounds of formula B are known compounds available from standard sources or can be prepared according to known procedures or obvious modifications thereof. For example, ω-bromoacetophenone and various substituted bromoacetophenones, can be prepared via bromination of the corresponding acetophenone or ring substituted acetophenones according to the procedures described in Fieser and Fieser, *Reagents for Organic Synthesis*, Wiley, New York (1967), page 161 and King et al., *J. Organic Chem.*, v. 29, page 3459 (1964). Suitable mild reducing agents which can be used, include, for example, sodium bisulfite, sodium sulfite, potassium sulfite, potassium bisulfite, sodium hydrophosphite, sodium thiosulfate, and the like. Suitable mild bases include, for example, sodium bicarbonate, potassium bicarbonate, sodium carbonate, potassium carbonate, sodium acetate, bis-[1,8-dimethylaminonaphthalene] and the like.

The pharmaceutically acceptable salts of my invention can be conveniently prepared by treating the corresponding amine of formula I, of my invention, with an acid or via other conventional procedures such as, for example, ion exchange.

The compounds of formula I and their pharmaceutically acceptable salts, of my invention, are useful in palliating conditions of depression, in mammals, which are related to the central nervous system. In general, the preferred dosage depends upon the particular subject and disorder being treated and can vary within wide limits such as, for example, between one and 400 mg. per kg. of body weight per day. Generally, the compounds can be administered in the same manner as imipramine; however, since dosages can vary so widely, the compounds should be administered under the direction of one authorized to administer compounds affecting the central nervous system. The compounds can be administered orally or parenterally such as, for example, by intramuscular injection. Where the compounds are administered orally, they can be administered as pills, tablets, capsules, solutions, or in virtually any of the various forms used for oral administration.

A further understanding of the invention can be had from the following preparation and examples. Also, where necessary, the described procedures are repeated to provide sufficient quantities of starting materials for subsequent examples.

PREPARATION 1

This preparation illustrates methods of preparing ring substituted-ω-bromoacetophenones by bromination of the corresponding ring substituted acetophenone.

In this preparation a solution containing 1.76 g. (0.01 moles) of t-butylacetophenone in 20 ml. of chloroform is added to a briskly stirred suspension containing 4.47 g. (0.02 moles) of cupric bromide in 20 ml. of refluxing ethyl acetate. The resulting mixture is refluxed and stirred until the black suspended solid (cupric bromide) is observed to have disappeared. The mixture is then cooled to room temperature (i.e., about 20°C) and then filtered to remove precipitated cuprous bromide. The filtrate is treated with particulate activated charcoal and then filtered to remove the charcoal. The resulting filtrate is evaporated to dryness, under vacuum, affording a residue of p-(t-butyl)-ω-bromoacetophenone which is sufficiently pure for use as starting material in the ensuing examples.

Similarly by following the same procedure using the corresponding ring substituted acetophenones as starting materials, the following compounds are respectively prepared:

p-chloro-ω-bromoacetophenone;
o-chloro-ω-bromoacetophenone;
m-chloro-ω-bromoacetophenone;
p-fluoro-ω-bromoacetophenone;
o-fluoro-ω-bromoacetophenone;
m-fluoro-ω-bromoacetophenone;
p-bromo-ω-bromoacetophenone;
o-bromo-ωbromoacetophenone;
m-bromo-ω-bromoacetophenone;
p-iodo-ω-bromoacetophenone;
o-iodo-ω-bromoacetophenone;
m-iodo-ω-bromoacetophenone;
p-methyl-ω-bromoacetophenone;
o-methyl-ω-bromoacetophenone;
m-methyl-ω-bromoacetophenone;
p-(t-butyl)-ω-bromoacetophenone;
o-(t-butyl)-ω-bromacetophenone;
m-(t-butyl)-ω-bromoacetophenone;
p-(n-pentyl)-ω-bromoacetophenone;
o-(n-pentyl)-ω-bromoacetophenone;
m-(n-pentyl)-ω-bromoacetophenone;
p-trifluoromethyl-ω-bromoacetophenone;
o-trifluoromethyl-ω-bromoacetophenone;
m-trifluoromethyl-ω-bromoacetophenone;
p-(1,2,2,2tetrachloroethyl)-ω-bromoacetophenone;
o-(1,2,2,2-tetrachloroethyl)-ω-bromoacetophenone;
m-(1,2,2,2-tetrachloroethyl)-ω-bromoacetophenone;
p-methoxy-ω-bromoacetophenone;
o-methoxy-ω-bromoacetophenone;
m-methoxy-ω-bromoacetophenone;
p-(t-butoxy)-ω-bromoacetophenone;
o-(t-butoxy)-ω-bromoacetophenone; and
m-(t-butoxy)-ω-bromoacetophenone.

EXAMPLE 1

This example illustrates methods of preparing compounds of my invention wherein Y is hydrogen. In this example 50.7 mg. (0.192 mmoles) of 10,11-dihydro-10,11-methano-5-(γ-methylaminopropyl)-5H-dibenz[b,f]azepine and 50.7 mg. (0.256 mmoles) of ω-bromoacetophenone are dissolved in 1 ml. of benzene at 20°C. One ml. of water containing 2 mg. of sodium sulfite and 20 mg. of sodium bicarbonate is then added with constant stirring. The mixture is then aged for 2 hours, with constant stirring, at 20°C, and is then poured into 20 ml. of a 1:2 (by vol.) mixture of water and ether resulting in a liquid-liquid two phase mixture. The ether phase is separated, washed with water, and dried over magnesium sulfate. The residue is then further purified by preparative thin-layer chromatography on silica gel, employing a 10 percent acetone-90 percent benzene elution system, affording pure 10,11-dihydro-10,11-methano-5-[γ-(N-methyl-N-phenacyl)-5H-dibenz[b,f]azepine.

Similarly, by following the same procedure as above but using the corresponding 5-(γ-aminopropyl)dibenzazepine starting material, the following compounds are respectively prepared:

10,11-dihydro-10,11-fluoromethano-5-[γ-(N-methyl-N-phenacyl)aminopropyl]-5H-dibenz[b,f]azepine;

10,11-difluoromethano-10,11-dihydro-5-[γ-(N-methyl-N-phenacyl)aminopropyl]-5H-dibenz[b,f]azepine;

10,11-chlorofluoromethano-10,11-dihydro-5-[γ-(N-methyl-N-phenacyl)aminopropyl]-5H-dibenz[b,f]azepine;

10,11-chloromethano-10,11-dihydro-5-[γ-(N-methyl-N-phenacyl)aminopropyl]-5H-dibenz b,f]azepine;

10,11-dichloromethano-10,11-dihydro-5-[γ-(N-methyl-N-phenacyl)aminopropyl]-5H-dibenz[b,f]azepine;

3-chloro-10,11-dihydro-10,11-methano-5-[γ-(N-methyl-N-phenacyl)aminopropyl]-5H-dibenz[b,f]azepine;

3-chloro-10,11-dihydro-10,11-fluoromethano-5-[γ-(N-methyl-N-phenacyl)aminopropyl]-5H-dibenz[b,f]azepine;

3-chloro-10,11-difluoromethano-10,11-dihydro-5-[γ-(N-methyl-N-phenacyl)aminopropyl]-5H-dibenz[b,f]azepine;

3-chloro-10,11-chlorofluoromethano-10,11-dihydro-5-[γ-(N-methyl-N-phenacyl)aminopropyl]-5H-dibenz[b,f]azepine;

3-chloro-10,11-chloromethano-10,11-dihydro-5-[γ-(N-methyl-N-phenacyl)aminopropyl]-5H-dibenz[b,f]azepine;

3-chloro-10,11-dichloromethano-10,11-dihydro-5-[γ-(N-methyl-N-phenacyl)aminoprophyl]-5H-dibenz[b,f]azepine;

10,11-dihydro-10,11-methano-5-[γ-(N-methyl-N-phenacyl)aminopropyl]-3-trifluoromethyl-5H-dibenz[b,f]azepine;

10,11-dihydro-10,11-fluoromethano-5-[γ-(N-methyl-N-phenacyl)aminopropyl]-3-trifluoromethyl-5H-dibenz[b,f]azepine;

10,11-difluoromethano-10,11-dihydro-5-[-dihydro-5-[γ-(N-methyl-N-phenacyl)aminopropyl]-3-trifluoromethyl-5H-dibenz[b,f]azepine;

10,11-dihydro-10,11-fluorochloromethano-5-[γ-(N-methyl-N-phenacyl)aminopropyl]-3-trifluoromethyl-5H-dibenz[b,f]azepine;

10,11-chloromethano-10,11-dihydro-5-[γ-(N-methyl-N-phenacyl)aminopropyl]-3-trifluoromethyl-5H-dibenz[b,f]azepine; and 10,11-dichloromethano-10,11-dihydro-5-[γ-(N-methyl-N-phenacyl)aminopropyl]-3-trifluoromethyl-5H-dibenz[b,f]azepine.

This example illustrates methods of preparing compounds of my invention wherein Y is halo and also addition salts thereof. In this example 1.50 g. (5.40 mmoles) of 10,11-dihydro-10,11-methano-5-(γ-methylaminopropyl)-5H-dibenz[b,f]azepine and 1.50 g. (6.44 mmoles) of p-chloro-ω-bromoacetophenone are dissolved in 15 ml. of benzene at 20°C. Ten ml. of water containing 60 mg. of sodium sulfite and 600 mg. of sodium bicarbonate is then added with constant stirring. The mixture is then aged for 2 hours, with constant stirring, at 20°C, and is then poured into 50 ml. of water resulting in a liquid-liquid two phase mixture. The organic phase is separated and divided into two equal portions. The first portion is washed with water and dried over magnesium sulfate. The resulting residue is then further purified by preparative thin-layer chromatography, according to the procedure of Example 1, affording pure 10,11-dihydro-10,11-methano-5-[γ-(N-methyl-N-p-chlorophenacyl)aminopropyl]-5H-dibenz[b,f]azepine.

The remaining portion of organic phase is evaporated to dryness at about 20°C under reduced pressure. The resulting residue is dissolved in 30 ml. of diethyl ether. A one normal solution of hydrogen chloride in diethyl ether is then slowly added, at about 20°C, until precipitation is complete (about 2–3 ml. of the ethereal hydrogen chloride solution is required). The resulting precipitate is collected by filtration, washed three times with anhydrous ether and then dried at 20°C, under reduced pressure, affording the hydrochloride salt of 10,11-dihydro-10,11-methano-5-[γ-(N-methyl-N-p-chlorophenacyl)aminopropyl]-5H-dibenz[b,f]azepine.

Similarly, by following the same procedure as above but using the corresponding 5-(γ-aminopropyl)dibenzazepine starting material, the following compounds and also their corresponding hydrochloride addition salts are respectively prepared:

10,11-dihydro-10,11-fluoromethano-5-[γ-(N-methyl-N-[p-chlorophenacyl])aminopropyl]-5H-dibenz[b,f]azepine;

10,11-difluoromethano-10,11-dihydro-5-[γ-(N-methyl-N-p-chlorophenacyl])aminopropyl]-5H-dibenz[b,f]azepine;

10,11-chlorofluoromethano-10,11-dihydro-5-[γ-(N-methyl-N-[p-chlorophenacyl])aminopropyl]-5H-dibenz[b,f]azepine;

10,11-chloromethano-10,11-dihydro-5-[γ-(N-methyl-N-[p-chlorophenacyl])aminopropyl]-5H-dibenz[b,f]azepine;

10,11-dichloromethano-10,11-dihydro-5-[γ-(N-methyl-N-[p-chlorophenacyl])aminopropyl]-5H-dibenz[b,f]azepine;

3-chloro-10,11-dihydro-10,11-methano-5-[γ-(N-methyl-N-[p-chlorophenacyl])aminopropyl]-5H-dibenz[b,f]azepine;

3-chloro-10,11-dihydro-10,11-fluoromethano-5-[γ-(N-methyl-N-[p-chlorophenacyl])aminopropyl]-5H-dibenz[b,f]azepine;

3-chloro-10,11-difluoromethano-10,11-dihydro-5-[γ-(N-methyl-N-[p-chlorophenacyl])aminopropyl]-5H-dibenz[[b,f]azepine;

3-chloro-10,11-chlorofluoromethano-10,11-dihydro-5[γ-(N-methyl-N-[p-chlorophenacyl])aminopropyl]-5H-dibenz[b,f]azepine;

3-chloro-10,11-chloromethano-10,11-dihydro-5-[γ-(N-methyl-N-[p-chlorophenacyl])aminopropyl]-5H-dibenz[b,f]azepine;

3-chloro-10,11-dichloromethano-10,11-dihydro-5-[γ-(N-methyl-N-[p-chlorophenacyl])aminopropyl]-5H-dibenz[b,f]azepine;

10,11-dihydro-10,11-methano-5-[γ-(N-methyl-N-[p-chlorophenacyl])aminopropyl]-3-trifluoromethyl-5H-dibenz[b,f]azepine;

10,11-dihydro-10,11-fluoromethano-5-[γ-(N-methyl-N-[p-chlorophenacyl])aminopropyl]-3-trifluoromethyl-5H-dibenz[b,f]azepine;

10,11-difluoromethano-10,11-dihydro-5-[γ-(N-methyl-N-[p-chlorophenacyl])aminopropyl]-3-trifluoromethyl-5H-dibenz[b,f]azepine;

10,11-dihydro-10,11-fluorochloromethano-5-[γ-(N-methyl-N-[p-chlorophenacyl])aminopropyl]-3-trifluoromethyl-5H-dibenz[b,f]azepine;

10,11-chloromethano-10,11-dihydro-5-[γ-(N-methyl-N-[p-chlorophenacyl])aminopropyl]-3-trifluoromethyl-5H-dibenz[b,f]azepine; and 10,11-dichloromethano-10,11-dihydro-5-[γ-(N-methyl-N-[p-chlorophenacyl])aminopropyl]-3-trifluoromethyl-5H-dibenz[b,f]azepine.

Similarly by following the same procedure as above but respectively using p-fluoro-ω-bromoacetophenone; p-bromo-ω-bromoacetophenone; and p-iodo-ω-bromoacetophenone, the corresponding p-ring substituted fluoro; bromo; and iodo phenacyl analogs of each of the above p-chlorophenacyl compounds are respectively prepared.

Similarly by using m-chloro-ω-bromoacetophenone; o-chloro-ω-bromoacetophenone; m-fluoro-ω-bromoacetophenone; o-fluoro-ω-bromoacetophenone; m-bromo-ω-bromoacetophenone; o-bromo-ω-bromoacetophenone; m-iodo-ω-bromoacetophenone; and o-iodo-ω-bromoacetophenone, respectively, the corresponding meta-halo and ortho-halo ring substituted phenacyl analogs of each of the above compounds are respectively prepared.

EXAMPLE 3

This example illustrates methods of preparing compounds of my invention wherein Y is lower alkyl. In this example 196 mg. (0.70 mmoles) of 10,11-dihydro-10,11-methano-5-(γ-methylaminopropyl)-5H-dibenz[b,f]azepine and 182 mg. (0.85 mmoles) of p-methyl-ω-bromoacetophenone are dissolved in 25 ml. of diethyl ether at 20°C. Five ml. of water containing 10 mg. of sodium sulfite and 100 mg. of sodium bicarbonate is then added with constant stirring. The mixture is then aged for 16 hours, with constant stirring, at 20°C, and is then poured into 25 ml. of water resulting in a liquid-liquid two phase mixture. The ether phase is separated, washed with water and dried over anhydrous potassium carbonate. The residue is then further purified by adsorption column chromatography on silica gel, elution with benzene:ether mixtures affording pure 10,11-dihydro-10,11-methano-5-[γ-(N-methyl-N-p-methylphenacyl)aminopropyl]-5H-dibenz[b,f]azepine.

Similarly, by following the same procedure as above but using the corresponding 5-(γ-aminopropyl)dibenzazepine starting material, the following compounds are respectively prepared:

10,11-dihydro-10,11-fluoromethano-5-[γ-(N-methyl-N-[p-methylphenacyl])aminopropyl]-5H-dibenz[b,f]azepine;

10,11-difluoromethano-10,11-dihydro-5-[γ-(N-methyl-N-[p-methylphenacyl])aminopropyl]-5H-dibenz[b,f]azepine;

10,11-chlorofluoromethano-10,11-dihydro-5-[γ-(N-methyl-N-[p-methylphenacyl])aminopropyl]-5H-dibenz[b,f]azepine;

10,11-chloromethano-10,11-dihydro-5-[γ-(N-methyl-N-[p-methylphenacyl])aminopropyl]-5H-dibenz[b,f]azepine;

10,11-dichloromethano-10,11-dihydro-5-[γ-(N-methyl-N-[p-methylphenacyl])aminopropyl]-5H-dibenz[b,f]azepine;

3-chloro-10,11-dihydro-10,11-methano-5-[γ-(N-methyl-N-[p-methylphenacyl])aminopropyl]-5H-dibenz[b,f]azepine;

3-chloro-10,11-dihydro-10,11-fluoromethano-5-[γ-(N-methyl- N-[p-methylphenacyl])aminopropyl]-5H-dibenz[b,f]azepine;

3-chloro-10,11-difluoromethano-10,11-dihydro-5-[γ-(N-methyl-N-[p-methylphenacyl])aminopropyl]-5H-dibenz[b,f]azepine;

3-chloro-10,11-chlorofluoromethano-10,11-dihdro-5-[γ-N-methyl-N-[p-methylphenacyl])aminopropyl]-5H-dibenz[b,f] azepine;

3-chloro-10,11-chloromethano-10,11-dihydro-5-[γ-(N-methyl-N-[p-methylphenacyl])aminopropyl]-5H-dibenz[b,f]azepine;

3-chloro-10,11-dichloromethano-10,11-dihydro-5-[γ-(N- methyl-N-[p-methylphenacyl])aminopropyl]-5H-dibenz[b,f]azepine;

10,11-dihydro-10,11-methano-5-[γ-(N-methyl-N-[p-methyl- phenacyl])aminopropyl]-3-trifluoromethyl-5H-dibenz[b,f]azepine;

10,11-dihydro-10,11-fluoromethano-5-[γ-(N-methyl-N-[p-methylphenacyl])aminopropyl]-3-trifluoromethyl-5H-dibenz[b,f] azepine;

10,11-difluoromethano-10,11-dihydro-5-[γ-(N-methyl-N-[p-methylphenacyl])aminopropyl]-3-trifluoromethyl-5H-dibenz[b,f]azepine;

10,11-chloromethano-10,11-dihydro-5-[γ-(N-methyl-N-[p-methylphenacyl])aminopropyl]-3-trifluoromethyl-5H-dibenz[b,f] azepine; and 10,11-dichloromethano-10,11-dihydro-5-[γ-(N-methyl-N- [p-methylphenacyl])aminopropyl]-3-trifluoromethyl-5H-dibenz[b,f]azepine.

Similarily by following the same procedure as above but respectively using p-(t-butyl)-ω-bromoacetophenone and p-(n-pentyl)-ω-bromacetophenone, in place of p-methyl-ω-bromoacetophenone, the corresponding p-(t-butyl) and p-(n-pentyl) ring substituted homologs of each of the above p-methyl-acetophenone compounds are respectively prepared.

Similarily by using m-methyl-ω-bromoacetophenone; o-methyl-ω-bromoacetophenone; m-(t-butyl)-ω-bromoacetophenone; o-(t-butyl)-ω-bromoacetophenone; m-(n-pentyl)-ω-bromacetophenone; and o-(n-pentyl)-ω-bromoacetophenone, respectively, the corresponding meta-methyl; meta-t-butyl and meta-n-pentyl and ortho-methyl; ortho-t-butyl and ortho-n-pentyl positioned ring substituted phenacyl analogs of each of the above compounds are respectively prepared.

EXAMPLE 4

This example illustrates methods of preparing compounds of my invention wherein Y is haloalkyl. In this example 140 mg. (0.50 mmoles) of 10,11-dihydro-10,11-methano-5-(γ-methylaminopropyl)-5H-dibenz[b,f]azepine and 268 mg. (1.00 mmoles) of p-trifluoromethyl-ω-bromoacetophenone are dissolved in 30 ml. of benzene at 20°C. Ten ml. of water containing 10 mg. of sodium sulfite and 1.00 mg. of sodium bicarbonate is then added with constant stirring. The mixture is heated for 2 hours, with constant stirring under a nitrogen atmosphere, at 40°C, and then poured into 40 ml. of a 1:1; (by vol.) mixture of water and ether resulting in a liquid-liquid two phase mixture. The ether phase is separated, washed with water and dried over magnesium sulfate. The residue is then further purified by preparative -N-methyl-N-p-trifluoromethylphenacyl)aminopropyl- chromatography, as described in Example 1, affording pure 10,11-dihydro-10,11-methano-5-[γ-N-p-trifluoromethylphenacyl)aminopropyl-5H-dibenz[b,f]azepine.

Similarly, by following the same procedure as above but using the corresponding 5-(γ-aminopropyl)dibenzazepine starting material, the following compounds are respectively prepared:

10,11-dihydro-10,11-fluoromethano-5-[γ-(N-methyl-N-[p-trifluoromethylphenacyl])aminopropyl]-5H-dibenz[b,f]azepine;

10,11-difluoromethano-10,11-dihydro-5-[γ-(N-methyl-N-[p-trifluoromethylphenacyl])aminopropyl]-5H-dibenz[b,f]azepine;

10,11-chlorofluoromethano-10,11-dihydro-5-[γ-(N-methyl-N-[p-trifluoromethylphenacyl])aminopropyl]-5H-dibenz[b,f]azepine;

10,11-chloromethano-10,11-dihydro-5-[γ-(N-methyl-N-[p-trifluoromethylphenacyl])aminopropyl]-5H-dibenz[b,f]azepine;

10,11-dichloromethano-10,11-dihydro-5-[γ-(N-methyl-N-[p-trifluoromethylphenacyl])aminopropyl]-5H-dibenz[b,f]azepine;

3-chloro-10,11-dihydro-10,11-methano-5-[γ-(N-methyl-N-[p-trifluoromethylphenacyl])aminopropyl]-5H-dibenz[b,f]azepine;

3-chloro-10,11-dihydro-10,11-fluoromethano-5-[γ-(N-methyl-N-[p-trifluoromethylphenacyl])aminopropyl]-5H-dibenz[b,f]azepine;

3-chloro-10,11-difluoromethano-10,11-dihydro-5-[γ-(N-methyl-N-[p-trifluoromethylphenacyl])aminopropyl]-5H-dibenz[b,f]azepine;

3-chloro-10,11-chlorofluoromethano-10,11-dihydro-5-[γ-(N-methyl-N-[p-trifluoromethylphenacyl])aminopropyl]-5H-dibenz[b,f]azepine;

3-chloro-10,11-chloromethano-10,11-dihydro-5-[γ-(N-methyl-N-[p-trifluoromethylphenacyl])aminopropyl]-5H-dibenz[b,f]azepine;

3-chloro-10,11-dichloromethano-10,11-dihydro-5-[γ-(N-methyl-N-[p-trifluoromethylphenacyl])aminopropyl]-5H-dibenz[b,f]azepine;

10,11-dihydro-10,11-methano-5-[γ-(N-methyl-N-[p-trifluoromethylphenacyl])aminopropyl]-3-trifluoromethyl-5H-dibenz[b,f]azepine;

10,11-dihydro-10,11-fluoromethano-5-[γ-(N-methyl-N-[p-trifluoromethylphenacyl])aminopropyl]-3-trifluoromethyl-5H-dibenz[b,f]azepine;

10,11-difluoromethano-10,11-dihydro-5-[γ-(N-methyl-N-[p-trifluoromethylphenacyl])aminopropyl]-3-trifluoromethyl-5H-dibenz[b,f]azepine;

10,11-dihydro-10,11-fluorochloromethano-5-[γ-(N-methyl-N-[p-trifluoromethylphenacyl])aminopropyl]-3-trifluoromethyl-5H-dibenz[b,f]azepine;

10,11-chloromethano-10,11-dihydro-5-[γ-(N-methyl-N-[p-trifluoromethylphenacyl])aminopropyl]-3-trifluoromethyl-5H-dibenz[b,f]azepine; and 10,11-dichloromethano-10,11-dihydro-5-[γ-(N-methyl-N-[p-trifluoromethylphenacyl])aminopropyl]-3-trifluoromethyl-5H-dibenz[b,f]azepine.

Similarly by following the same procedure but respectively using o-trifluoromethyl-ω-bromoacetophenone and m-trifluoromethyl-ω-bromoacetophenone in place of p-trifluoromethyl-ω-bromoacetophenone, the corresponding ortho-trifluoromethylphenacyl and meta-trifluoromethylphenacyl analogs of each of the above compounds are respectively prepared.

Similarly by respectively using p-(1,2,2,2-tetrachloroethyl)-ω-bromoacetophenone; o-(1,2,2,2-tetrachloroethyl-ω-bromoacetophenone; and m-(1,2,2,2-tetrachloroethyl)-ω-bromoacetophenone, the corresponding para, ortho and meta-1,2,2,2-tetrachloroethylphenacyl analogs of the above compounds are respectively prepared.

EXAMPLE 5

This example illustrates methods of preparing compounds of my invention wherein Y is lower alkoxy. In this example 160 mg. (0.57 mmoles) of 10,11-dihydro-10,11-methano-5-(γ-methylaminopropyl)-5H-dibenz[b,f]azepine and 140 mg. (0.6 mmoles) of p-methoxy-ω-bromoacetophenone are dissolved in 20 ml. of a 1:1 mixture of benzene and diethyl ether at 0°C. Five ml. of water containing 10 mg. of sodium sulfite and 100 mg. of sodium bicarbonate is then added with constant stirring. The mixture is stirred for 6 hours at 0°–5° and is then worked up according to the procedure of Example 1, affording pure 10,11-dihydro-10,11-methano-5-[γ-(N-methyl-N-[p-methoxyphenacyl])aminopropyl]-5H-dibenz[b,f]azepine.

Similarly, by following the same procedure as above but using the corresponding 5-(γ-aminopropyl)dibenzazepine starting material, the following compounds are respectively prepared:

10,11-dihydro-10,11-methano-5-[γ-(N-methyl-N-[p-methoxyphenacyl])aminopropyl]-5H-dibenz[b,f]azepine;

10,11-dihydro-10,11-fluoromethano-5-[γ-(N-methyl-N-[p-methoxyphenacyl])aminopropyl]-5H-dibenz[b,f]azepine;

10,11-difluoromethano-10,11-dihydro-5-[γ-(N-methyl-N-[p-methoxyphenacyl])aminopropyl]-5H-dibenz[b,f]azepine;

10,11-chlorofluoromethano-10,11-dihydro-5-[γ-(N-methyl-N-[p-methoxyphenacyl])aminopropyl]-5H-dibenz[b,f]azepine;

10,11-chloromethano-10,11-dihydro-5-[γ-(N-methyl-N-[p-methoxyphenacyl])aminopropyl]-5H-dibenz[b,f]azepine;

10,11-dichloromethano-10,11-dihydro-5-[γ-(N-methyl-N-[p-methoxyphenacyl])aminopropyl]-5H-dibenz[b,f]azepine;

3-chloro-10,11-dihydro-10,11-methano-5-[γ-(N-methyl-N-[p-methoxyphenacyl])aminopropyl]-5H-dibenz[b,f]azepine;

3-chloro-10,11-dihydro-10,11-fluoromethano-5-[γ-(N-methyl-N-[p-methoxyphenacyl])aminopropyl]-5H-dibenz[b,f]azepine;

3-chloro-10,11-difluoromethano-10,11-dihydro-5-[γ-(N-methyl-N-[p-methoxyphenacyl])aminopropyl]-5H-dibenz[b,f]azepine;

3-chloro-10,11-chlorofluoromethano-10,11-dihydro-5-[γ-(N-methyl-N-[p-methoxyphenacyl])aminopropyl]-5H-dibenz[b,f]azepine;

3-chloro-10,11-chloromethano-10,11-dihydro-5-[γ-(N-methyl-N-[p-methoxyphenacyl])aminopropyl]-5H-dibenz[b,f]azepine;

3-chloro-10,11-dichloromethano-10,11-dihydro-5-[γ-(N-methyl-N-[p-methoxyphenacy])aminopropyl]-5H-dibenz[b,f]azepine;

10,11-dihydro-10,11-methano-5-[γ-(N-methyl-N-[p-methoxyphenacyl])aminopropyl]-3-trifluoromethyl-5H-dibenz[b,f]azepine;

10,11-dihydro-10,11-fluoromethano-5-[γ-(N-methyl-N-[p-methoxyphenacyl])aminopropyl]-3-trifluoromethyl-5H-dibenz[b,f]azepine;

10,11-difluoromethano-10,11-dihydro-5-[γ-(N-methyl-N-[p-methoxyphenacyl])aminopropyl]-3-trifluoromethyl-5H-dibenz[b,f]azepine;

10,11-dihydro-10,11-fluorochloromethano-5-[γ-(N-methyl-N-[p-methoxyphenacyl])aminopropyl]-3-trifluoromethyl-5H-dibenz[b,f]azepine;

10,11-chloromethano-10,11-dihydro-5-[γ-(N-methyl-N-[p-methoxyphenacyl])aminopropyl]-3-trifluoromethyl-5H-dibenz[b,f]azepine; and 10,11-dichloromethano-10,11-dihydro-5-[γ-(N-methyl-N-[p-methoxyphenacyl])aminopropyl]-3-trifluoromethyl-5H-dibenz[b,f]azepine.

Similarly by following the same procedure but using p-(t-butoxy)-ω-bromoacetophenone in place of p-methoxy-ω-bromoacetophenone, the corresponding p-(t-butoxy) ring substituted phenacyl analogs of each of the above compounds is respectively prepared.

similarly by using m-methoxy-ω-bromoacetophenone; o-methoxy-ω-bromoacetophenone; m-(t-butoxy-ω-bromoacetophenone; and o-butoxy-ω-bromoacetophenone, respectively, the corresponding meta and ortho positioned alkoxy ring substituted phenacyl analogs of the above compounds are respectively prepared.

Obviously many modifications and variations of the invention, described herein above and below in the claims, can be made without departing from the essence and scope thereof.

What is claimed is:

1. A compound having the formula 10,11-difluoromethano-10,11-dihydro-5-(γ-(N-p-chlorophenacyl-N-methyl)-aminopropyl)-5H-dibenz(b,f)azepine.

* * * * *